June 2, 1931.  K. KOLLINEK  1,807,848
PRESSURE MEDIUM BRAKE AND STEERING DEVICE FOR AIRCRAFT
Filed Aug. 5, 1930
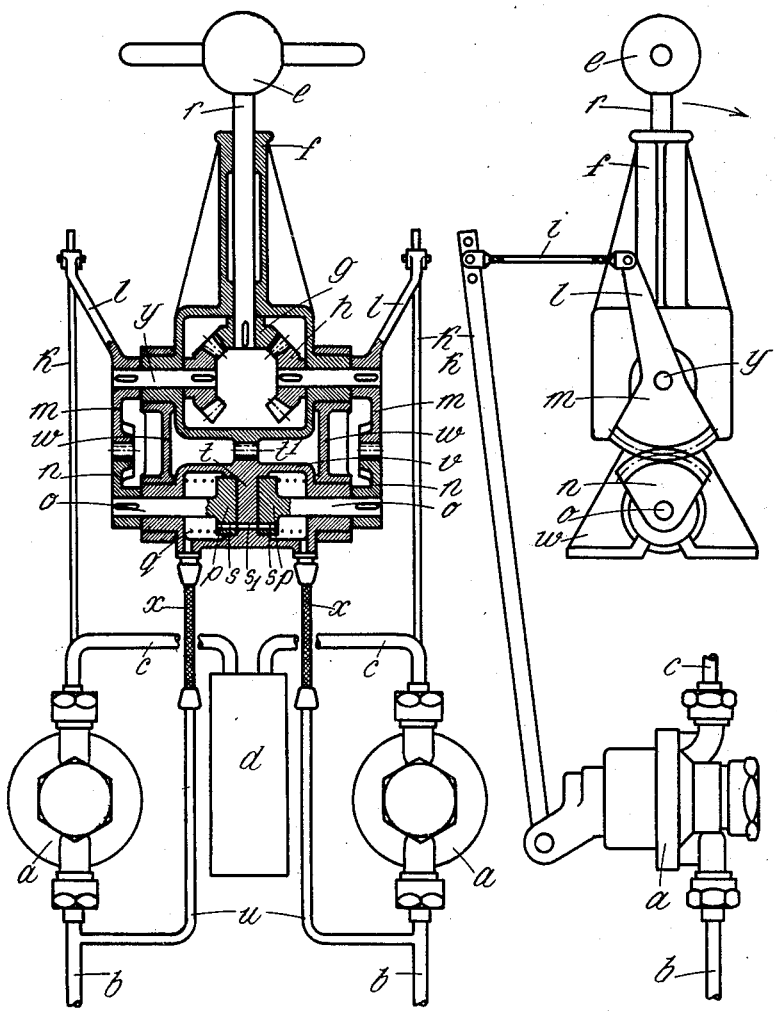

Patented June 2, 1931

1,807,848

UNITED STATES PATENT OFFICE

KURT KOLLINEK, OF KARLSHORST, BERLIN, GERMANY, ASSIGNOR TO KNORR-BREMSE AKTIENGESELLSCHAFT, OF LICHTENBERG, BERLIN, GERMANY, A CORPORATION OF GERMANY

PRESSURE MEDIUM BRAKE AND STEERING DEVICE FOR AIRCRAFT

Application filed August 5, 1930, Serial No. 473,258, and in Germany June 23, 1930.

This invention relates to pressure medium brakes and steering devices for aircraft, of the kind in which the valves effecting the charging and relieving of the brake cylinders are controlled by differential gearing, which gearing for braking purposes is intended to cause uniform and uniformly directed movements of the said valves, but for steering purposes is operated to cause movements of the respective valves in opposite directions.

In the use of pressure medium brakes and steering devices for aircraft, uniform service of the brake valves provided for each side of the aircraft has frequently resulted in the aircraft's taking a path deviating from the desired straight direction and running off into curves, which is attributable to differences in the operation of the springs contained in the brake valves. Endeavours have been made to avoid this difficulty by arranging a third valve between the pressure medium container and the two brake valves, this third valve, which determines the level of the pressure in the brake cylinders, being opened upon each braking operation, not only in the case of uniform braking but also with one sided braking for steering purposes.

The chief object of the present invention is to provide a pressure medium brake and steering device which will ensure a straight brake path with uniform service of the brake valves and which differs from the devices hitherto proposed in that it renders unnecessary a third valve arranged between the pressure medium container and the brake valves; having springs which occasionally cause difficulties.

According to the invention a member controlled by the differential gear is adapted to place the pipes leading from the respective brake valves to the brake cylinders in communication with each other through branch pipes for uniform brake application, and to interrupt such communication upon the brake valves being operated for steering the aircraft.

In order that the said invention may be clearly understood and readily carried into effect, the same will now be more fully described with reference to the accompanying drawings or diagrams illustrating a constructional embodiment of the invention in which a rotary slide valve is interposed in a connecting pipe between the two pipes leading from the brake valves to the brake cylinders.

Figure 1 represents the said embodiment in elevation, partly in section, and Figure 2 is a side elevation thereof.

The brake valves $a$, $a$ are in communication through the pipes $b$ with the brake cylinders (not shown) and through the pipes $c$ with the pressure medium container $d$. The said valves are operated either concurrently (on braking) or inversely (on steering) by means of the known differential gearing $e$, $f$, $g$, $h$ and the levers $i$, $k$ and $l$.

The levers $l$ are rocked by the movements of rotation imparted to the spindles $y$ of the pinions $h$, and are provided at their lower ends with toothed segments $m$ in mesh with segments $n$ secured on the spindles $o$ of rotary valves $p$ loaded with light springs $q$ and adapted to slide in contact with an intermediate member $t$, which latter is made in one piece with the housing $v$ pivotally mounted in the side walls $w$ and provided with segmental gear teeth at $t^1$ (Figure 1) in mesh with segmental teeth formed on the housing $f$ of the differential gearing, whereby the member $t$ can be rocked relatively to the valves $p$. In the position illustrated, borings $s$ in the valves $p$ register with borings $s^1$ in the member $t$. Pipes $u$ which branch off from the pipes $b$ leading to the brake cylinders open into the ends of the housing $v$ accommodating the rotary valves $p$, the connections between the pipes $u$ and the housing $v$ including flexible portions $x$.

When applying the brakes by rocking the differential gearing housing $f$ about the transverse axis $y$ in the direction of rotation indicated by an arrow in Figure 2, as is well known, the valves $a$ will be uniformly opened, consequently pressure medium is uniformly supplied to the brake cylinders on both sides of the aircraft. The rotation of the housing $f$ results in the rotation in the opposite direction of the housing $v$ and of the slide valve p. The gear teeth are so selected that the rotary slide valves p and the intermediate member t traverse the same angle of rotation. Consequently the borings s and $s^1$ in the rotary slide valves and in the member t remain in register. The pipes b and u hence remain in communication with each other. Pressure differences in the brake cylinders which might otherwise occur in consequence of differences in the action of the springs in the brake valves a are entirely obviated, because the pressures are equalized through the connections b, u, s and $s^1$.

When it is desired to utilize the brakes for steering the aircraft, the main spindle r of the differential gear is rotated around its own axis, that is, in a plane at right angles to the plane of movement indicated in Figure 2; the differential gear then causes a displacement in the opposite direction of the levers l, the toothed segments m and n, and consequently of the rotary slides p, whilst the member t remains motionless. The registering of the borings s and $s^1$ in the rotary slides p and in the member t is thus interrupted and the communication between the pipes u is cut off. The action of the pressure medium in the respective brake cylinders is consequently differentiated in accordance with the purpose in view (steering of the aircraft).

What I claim and desire to secure by Letters Patent of the United States is:—

1. In pressure medium brake apparatus for aircraft, a source of pressure medium, pipes to admit said medium to the right and left hand brake cylinders respectively, valves controlling the passage of said medium to and from the respective pipes, branch connections between said pipes to equalize the pressure therein, differential gear to operate said valves, a member interposed in said connections and also operable by said gear to obstruct said connections to prevent such equalization.

2. In pressure medium brake apparatus for aircraft, a source of pressure medium, pipes to admit said medium to the right and left hand brake cylinders respectively, valves controlling the passage of said medium to and from the respective pipes, branch connections between said pipes to equalize the pressure therein, differential gear to operate said valves, a rotary slide valve interposed in said connections and also operable by said gear to obstruct said connections to prevent such equalization.

3. In pressure medium brake apparatus for aircraft, a source of pressure medium, pipes to admit said medium to the right and left hand brake cylinders respectively, valves controlling the passage of said medium to and from the respective pipes, branch connections between said pipes to equalize the pressure therein, differential gear to operate said valves, said gear being mounted in an oscillatable housing, a valve casing mounted in said housing and divided into two chambers by a partition provided with a duct, said chambers communicating with said branch connections, a plurality of slide valves rotatable in said chambers and each provided with a duct adapted to register with the duct in said partition to maintain communication between said branch connections, means controlled by the differential gear to rotate said slide valves relatively to the housing to remove the ducts in said slide valves from registering with the duct in said partition, whereby equalization of pressure in said pipes can be prevented.

4. Apparatus as in claim 3, wherein the brake valves are operable by levers separately actuated by the differential gear, the said levers comprising segmental gear teeth in mesh with toothed segments secured on the spindles of the rotary slide valves.

KURT KOLLINEK.